April 15, 1941.　　　J. B. BRENNAN　　　2,238,031

CONDENSER AND METHOD OF MAKING SAME

Filed June 10, 1938

INVENTOR.
JOSEPH B. BRENNAN

BY Richey + Watts

ATTORNEYS

Patented Apr. 15, 1941

2,238,031

UNITED STATES PATENT OFFICE 2,238,031

CONDENSER AND METHOD OF MAKING SAME

Joseph B. Brennan, Euclid, Ohio

Application June 10, 1938, Serial No. 213,038

2 Claims. (Cl. 175—41)

This invention relates to electric condensers or capacitors, and more particularly to condensers embodying dielectrics of vitreous material.

It is among the objects of my invention to provide a condenser which can be manufactured at low cost and which will have high capacity with relation to its size and embodying a dielectric of high strength. A further object is to provide a condenser which is sturdy and moisture proof, which will stand up under severe operating conditions and high voltages. Another object is to provide an economical terminal construction for condensers. Another object is to provide a condenser embodying a vitreous dielectric to which the condenser plates are bonded. A further object is to provide an economical and efficient method of making such condensers.

Figure 1:
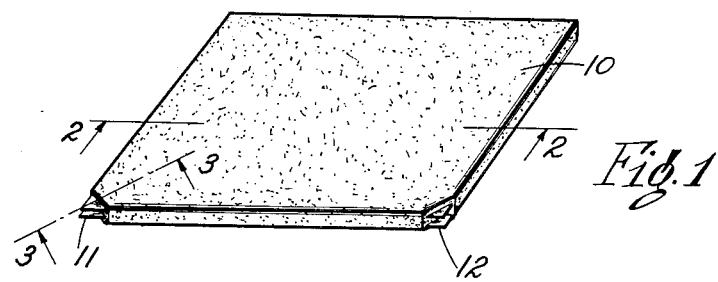
Figure 2:
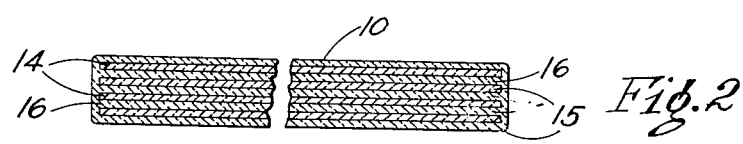
Figure 3:
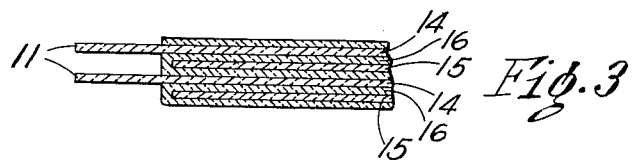
Figure 4:
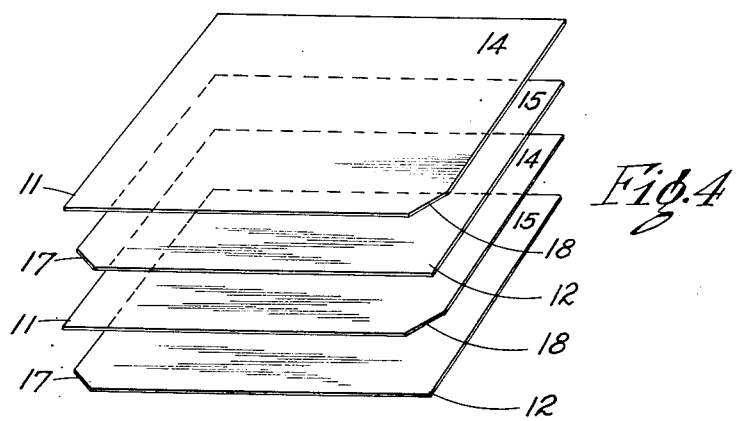

Other objects and advantages of my invention will become apparent from the following description of a preferred form thereof, reference being made to the accompanying drawing, in which Figure 1 is a perspective of a preferred form of condenser made according to my invention; Figure 2 is a section along the line 2—2 of Figure 1; Figure 3 is a fragmentary section as indicated by the line 3—3 on Figure 1; and Figure 4 is an expanded view showing the condenser plates before assembly.

According to a preferred form of my invention, I economically produce condensers of high dielectric strength and high capacity in relation to their size by employing a vitreous material as the dielectric, a preferred material being porcelain enamel. The condenser may be economically produced by coating the individual plates of the condenser with frit, i. e., enamel or glass in powder or paste form, then assembling the plates and placing the assembled plates in a furnace in which the assembly is heated to a high temperature to fuse the frit, thus forming a unitary structure in which the plates are sealed within an enamel envelope, the plates of opposite polarity being separated by a dielectric layer of porcelain enamel.

Referring to the drawing, Figure 1 illustrates a small condenser of the type employed in radio circuits, the plates of the condenser being enclosed within an envelope of enamel or other vitreous material indicated at 10 which completely covers all of the surfaces of the plates except the projecting corner portions 11 and 12 which may be employed as terminals to connect the condenser to an external circuit. It will be seen that by this construction the entire condenser is enclosed within a moisture proof envelope so that deterioration of the condenser due to atmospheric influences is entirely prevented.

The interior construction of the condenser, as shown in Figures 2 and 3, preferably comprises plates 14 and 15 of opposite polarity separated by thin layers of enamel or other vitreous material 16 which are continuous with the outer envelope 10 and which constitute the dielectric of the condenser. The plates 14 and 15 are preferably formed of thin sheets of ferrous material such as iron foil or very thin cold rolled low carbon steel. The thickness of the plates as well as the thickness of the dielectric layers 16 is exaggerated in the drawing for convenience of illustration, but obviously the thickness of these elements may be varied within reasonable limits depending upon the service for which the condenser is intended. Greater capacity per unit of area can be obtained by employing very thin dielectric layers, while the condensers will withstand greater operating voltages if the thickness of the layers is increased.

To provide convenient terminals for connecting the condenser to an external circuit, opposite corners of alternate plates are preferably cut away as indicated at 17 and 18 and the vitreous coating is omitted from the projecting corners of the adjacent plates so that the metal of the plates will be exposed to form the terminal portions 11 and 12. This construction will be evident from an examination of Figures 3 and 4 particularly.

In producing the condensers according to my preferred method, it is only necessary to cut the metallic foil to proper size and to cut away the corners as shown, then the frit is applied to all of the surfaces of the coils except the corners which will form the terminals 11 and 12. The frit may be applied by various methods, for example in paste form, preferably in an aqueous dispersion, or the plates may be dipped into a solution carrying the frit or the frit may be sprayed thereon. After the plates are coated with frit, they are separately dried to eliminate volatile matter from the coating so that gas bubbles will not be formed in the subsequent baking operation. Then they are assembled merely by stacking the plates one on top of the other in the relationship shown in Figure 4, pressure being applied, if desired, to hold the plates closely together and to flatten out any irregularities. Finally the assembled plates are baked to fuse the frit into a unitary vitreous mass in which the condenser plates are embedded, with the dielectric material adhering firmly to the plates.

Another method of making condensers according to my invention comprises coating sheets of ferrous material with frit, firing the sheets to produce an adherent coating, then cutting the enameled sheets to proper size to form condenser plates. The cut sheets may be assembled or stacked together as before and the assembly then dipped or otherwise coated with frit to cover the edges of the plates and form a vitreous envelope. The assembly is fired in the usual manner, thus enclosing the plates in a vitreous envelope, and if desired the firing may be carried out at sufficient temperature to fuse together the dielectric material between the plates and the envelope so that the envelope and dielectric layers are integral. My method may be further modified in that the frit may be applied to the plates and to the assembly and edges by spraying thereon in a molten condition. According to this method, the plates may be individually sprayed or large sheets may be sprayed and cut to size, and thereafter the plates may be assembled, the edges coated with enamel, and the assembly fired to form a unitary structure.

From the foregoing description of a preferred form of my invention, it will be evident that condensers can be made according to my invention at very low cost and by simple manufacturing steps. My condensers further have high capacity per unit of volume because the dielectric layers can be made very thin and because the enamel has high dielectric strength. Furthermore, as my condensers are completely enclosed in moisture proof vitreous envelopes they are protected from any damaging atmospheric influences and are therefore durable and adapted for use under severe conditions.

Various changes and modifications in my invention will be apparent to those skilled in the art. For example, other vitreous materials may be employed instead of porcelain enamel, also different terminal connections may be utilized, the condensers can be made of any convenient size, and any desired number of plates can be stacked together to form condensers of increased capacity. Therefore it is to be understood that my invention is not limited to the preferred form disclosed herein or in any manner other than by the appended claims when given the range of equivalents to which my patent may be entitled.

I claim:
1. A condenser comprising a plurality of plates embedded in and separated by vitreous dielectric material adhering thereto, said plates having integral corner portions projecting beyond said vitreous material for connection to an external circuit, the corner of each plate adjacent such a projecting corner of another plate being cut away.
2. A condenser comprising a plurality of substantially flat plates enclosed in an envelope of dielectric material, alternate plates having oppositely disposed projecting corner portions extending beyond said envelope of dielectric material for connection to an external circuit, and the corner of each plate adjacent such a projecting corner of another plate being cut away.

JOSEPH B. BRENNAN.